(12) United States Patent
Fukuma et al.

(10) Patent No.: US 9,110,093 B2
(45) Date of Patent: Aug. 18, 2015

(54) SEALED AFM CELL (71) Applicant: NATIONAL UNIVERSITY CORPORATION KANAZAWA UNIVERSITY, Ishikawa (JP)

(72) Inventors: Takeshi Fukuma, Ishikawa (JP); Hitoshi Asakawa, Ishikawa (JP); Yukitoshi Katagiri, Nagano (JP)

(73) Assignee: NATIONAL UNIVERSITY CORPORATION KANAZAWA UNIVERSITY, Ishikawa (JP)

( * ) Notice: Subject to any disclaimer, the term of this patent is extended or adjusted under 35 U.S.C. 154(b) by 0 days.

(21) Appl. No.: 14/357,011

(22) PCT Filed: Nov. 15, 2012

(86) PCT No.: PCT/JP2012/007326
§ 371 (c)(1),
(2) Date: May 8, 2014

(87) PCT Pub. No.: WO2013/073186
PCT Pub. Date: May 23, 2013

(65) Prior Publication Data
US 2014/0289910 A1 Sep. 25, 2014

(30) Foreign Application Priority Data
Nov. 15, 2011 (JP) .................................. 2011-249451

(51) Int. Cl.
*G01Q 30/14* (2010.01)
*G01Q 30/08* (2010.01)
(Continued)

(52) U.S. Cl.
CPC ................. *G01Q 30/14* (2013.01); *G01Q 10/00* (2013.01); *G01Q 30/08* (2013.01); *G01Q 30/12* (2013.01);
(Continued)

(58) Field of Classification Search
CPC ....... G01Q 30/08; G01Q 30/12; G01Q 30/14; G01Q 30/18; G01Q 60/24; G01Q 70/02
See application file for complete search history.

(56) References Cited

U.S. PATENT DOCUMENTS

| 5,319,960 A | * | 6/1994 | Gamble et al. ................... 73/105 |
| 5,750,989 A | * | 5/1998 | Lindsay et al. .................. 850/14 |

(Continued)

FOREIGN PATENT DOCUMENTS

| JP | 9-54098 | 2/1997 |
| JP | 9-229948 | 9/1997 |

(Continued)

OTHER PUBLICATIONS

International Search Report issued Dec. 25, 2012 in corresponding International Application No. PCT/JP2012/007326.

*Primary Examiner* — Michael Logie
(74) *Attorney, Agent, or Firm* — Wenderoth, Lind & Ponack, L.L.P.

(57) ABSTRACT

Provided is a sealed AFM cell in which measurement accuracy does not decrease and the types of observation liquids are not limited. A sealed AFM cell according to the present invention includes: a cantilever including a probe; a sample holder for fixing the sample; a scanner for moving the sample holder; a lid part which holds the cantilever so as to position the probe near a measurement surface of the sample; and a main body part which is a component for holding the scanner and positioned opposite the lid part with the sample in between, in which the lid part and the main body part are joined via a sealing liquid to seal the observation liquid inside a space formed by the lid part, the main body part, and the sealing liquid, the sealing liquid being different from the observation liquid and not in contact with the observation liquid.

5 Claims, 7 Drawing Sheets

(51) Int. Cl.
*G01Q 30/12* (2010.01)
*G01Q 30/18* (2010.01)
*G01Q 60/24* (2010.01)
*G01Q 70/02* (2010.01)
*G01Q 10/00* (2010.01)
*B82Y 35/00* (2011.01)
*G01Q 20/02* (2010.01)
*G01Q 60/32* (2010.01)

(52) U.S. Cl.
CPC ............ *G01Q 30/18* (2013.01); *G01Q 60/24* (2013.01); *G01Q 70/02* (2013.01); *B82Y 35/00* (2013.01); *G01Q 20/02* (2013.01); *G01Q 60/32* (2013.01)

(56) References Cited

U.S. PATENT DOCUMENTS

| | | | |
|---|---|---|---|
| 5,939,623 A * | 8/1999 | Muramatsu et al. | 73/105 |
| 6,002,131 A * | 12/1999 | Manalis et al. | 850/1 |
| 6,776,031 B2 | 8/2004 | Nakamura | |
| 6,810,721 B2 | 11/2004 | Nakamura | |
| 7,114,405 B2 * | 10/2006 | Sunwoldt et al. | 73/866.5 |
| 7,379,162 B2 | 5/2008 | Miyajima | |
| 7,602,476 B2 * | 10/2009 | Miyajima | 355/72 |
| 8,037,739 B2 | 10/2011 | Ota et al. | |
| 8,261,368 B2 * | 9/2012 | Bussan et al. | 850/1 |
| 8,746,039 B2 * | 6/2014 | Adams et al. | 73/31.05 |
| 2002/0139178 A1 | 10/2002 | Nakamura | |
| 2004/0025579 A1 * | 2/2004 | Nakamura | 73/105 |
| 2004/0026618 A1 * | 2/2004 | Nakamura | 250/306 |
| 2005/0017150 A1 * | 1/2005 | Sunwoldt et al. | 248/500 |
| 2005/0122505 A1 | 6/2005 | Miyajima | |
| 2006/0043289 A1 * | 3/2006 | West | 250/309 |
| 2008/0018036 A1 | 1/2008 | Miyajima | |
| 2008/0163702 A1 * | 7/2008 | Sunwoldt et al. | 73/864.91 |
| 2009/0032675 A1 * | 2/2009 | Miyakosawa et al. | 248/562 |
| 2010/0263096 A1 * | 10/2010 | Jahnke et al. | 850/8 |
| 2010/0306887 A1 * | 12/2010 | Sulchek et al. | 850/18 |
| 2011/0048115 A1 * | 3/2011 | Ota et al. | 73/64.56 |
| 2012/0278957 A1 * | 11/2012 | Phan et al. | 850/33 |

FOREIGN PATENT DOCUMENTS

| | | | |
|---|---|---|---|
| JP | 2002-286614 | 10/2002 | |
| JP | 2003-114181 | 4/2003 | |
| JP | 2005-175016 | 6/2005 | |
| JP | 2009-58231 | 3/2009 | |
| WO | WO 02084210 A1 * | 10/2002 | G01B 7/34 |

* cited by examiner

SEALED AFM CELL

TECHNICAL FIELD

The present invention relates to atomic force microscope (AFM) cells and, in particular, to a sealed AFM cell in which an observation liquid is sealed.

BACKGROUND ART

An atomic force microscope (hereinafter, also referred to as AFM) detects a force of interaction working between the surface of a sample and a probe held near the surface of the sample. Moreover, the AFM performs feedback control for the distance between the probe and the sample to keep the detected force of interaction constant. Furthermore, the AFM horizontally scans the sample while maintaining the feedback control. This allows the probe to go up and down along the surface asperities of the sample with a certain distance between the probe and the sample. The AFM can obtain a topographic image of the surface of the sample by recording the vertical movement of the probe with respect to the scanned horizontal position.

Here, a cantilever having the probe at its one end is used for a force sensor for detecting a force of interaction between the probe and the sample. An optical lever method, for example, is widely used for detecting the displacement magnitude of this cantilever. In the optical lever method, the displacement magnitude of the cantilever is detected by irradiating the back side of the cantilever with a light beam such as a laser beam and detecting light reflected off the back side with a position detection sensor such as a four-split photodiode.

The AFM is especially useful as a method for directly observing the shape and physical properties of the surface of a sample in a liquid. Hereinafter, an AFM for observing a sample in a liquid is referred to as liquid AFM. The liquid AFM measures the surface of a sample in the state where the cantilever and the sample are immersed in an observation liquid.

Here, a problem is in that evaporation of the observation liquid constantly changes the concentration of dissolved matter. Moreover, an increase in the amount of evaporation changes the solution shape of the observation liquid. Thus, a laser beam path may change. This makes it difficult to detect the accurate displacement magnitude of the cantilever.

In view of the problems, an approach to seal a space in an AFM cell with an elastic body such as a rubber O ring has been suggested (see Patent Literature 1 (PTL 1)). Evaporation can be prevented by sealing an observation liquid with the elastic body.

Moreover, an approach to prevent evaporation of an observation liquid by filling the surroundings of the observation liquid with a sealing liquid which does not mix with the observation liquid has been suggested (see Patent Literature 2 (PTL 2)).

CITATION LIST

Patent Literature

Japanese Unexamined Patent Application Publication No. 2002-286614

Japanese Unexamined Patent Application Publication No. 2009-58231

SUMMARY OF INVENTION

Technical Problem

However, the approach shown in PTL 1 has the following problem. When an AFM cell is sealed with an elastic body, vibration of a scanner, which is a drive unit for horizontally scanning a sample and controlling the distance between a probe and the sample, is transmitted to a cantilever. This decreases the accuracy of measurement by the AFM.

Moreover, the approach shown in PTL 2 has the following problem. Observation liquids are limited to particular liquids depending on the type of a sealing liquid. This will be described in detail below.

In general, in an AFM cell, a cantilever and a drive unit such as a scanner are not mechanically joined. When the cantilever and the drive unit such as the scanner are mechanically joined, mechanical vibration occurring in the drive unit is transmitted to the cantilever, This makes it difficult to accurately detect the displacement magnitude of the cantilever.

However, in PTL 1, the cantilever and the scanner are mechanically joined with the rubber O ring to seal the AFM cell. Thus, vibration of the scanner is transmitted to the cantilever via the O ring.

For instance, in an approach called dynamic mode AFM, a cantilever is oscillated at a minute amplitude to detect a force of interaction between a probe and a sample as a change in frequency, phase, amplitude, or others of the oscillation of the cantilever. Here, an acoustic excitation method using acoustic waves generated in a piezoelectric vibrator is widely used as an excitation method for oscillating the cantilever.

However, when the cantilever and the scanner are mechanically joined with the O ring as with the conventional art, acoustic waves for exciting the cantilever propagate to the whole AFM device through the O ring. As a result, mechanical resonance of a component of the AFM device such as a sample holder is excited. This complicates the resonance characteristics of oscillation of the cantilever. The complication of the resonance characteristics decreases the stability and quantitativity of oscillation of the cantilever when the cantilever is excited using a piezoelectric vibrator, Therefore, the accuracy of measurement by the AFM declines.

Moreover, as PTL 2 shows, when the surroundings of an observation liquid is filled with a sealing liquid, the mixture of the observation liquid and the sealing liquid should be completely avoided. Therefore, usable observation liquids are limited depending on the sealing liquid.

Specifically, it is practically important that liquids to be used as the observation liquid and the sealing liquid are less corrosive to the components of the AFM and cleansing is easy. Thus, many observations have been performed using an aqueous solution as the observation liquid. However, when the aqueous solution is used for the observation liquid, water which mixes with the aqueous solution cannot be used as the sealing liquid. That is, in the approach shown in PTL 2, usable observation liquids are limited in relation with the sealing liquid.

In view of the above problems, the present invention provides a sealed AFM cell which does not decrease measurement accuracy or limit usable observation liquids.

Solution to Problem

An aspect of a sealed atomic force microscope (AFM) cell according to the present invention is a sealed AFM cell for an AFM which measures a sample immersed in an observation liquid. The sealed AFM cell includes: a cantilever including a probe; a sample holder for fixing the sample; a scanner which is a drive unit which moves the sample holder; a lid part which holds the cantilever so as to position the probe near a measurement surface of the sample; and a main body part which is a component for holding the scanner and positioned opposite the lid part with the sample in between, in which the lid part and the main body part are joined via a sealing liquid to seal the observation liquid inside a space formed by the lid part, the main body part, and the sealing liquid, the sealing liquid being different from the observation liquid and not in contact with the observation liquid.

This configuration allows the sealed AFM cell to seal the observation liquid inside the space formed by the lid part, main body part, and the sealing liquid. Therefore, vibration of the scanner or others can be prevented from being transmitted to the cantilever while suppressing evaporation of the observation liquid. Moreover, the sealing liquid and the observation liquid are not in contact. Therefore, usable observation liquids are not limited to particular liquids.

Specifically, at least one of the lid part and the main body part may have a groove formed by a component having water repellency or oil repellency and the lid part or the main body part, and the groove may hold the sealing liquid.

According to this, the sealed AFM cell has a groove formed by the component having water repellency or oil repellency and the lid part or the main body part. Therefore, the sealed AFM cell can hold the sealing liquid more stably.

Moreover, at least one of the lid part and the main body part may have a wall protruding from one of the lid part and the main body part toward the other to surround the sample holder, and an end portion of the wall may hold the sealing liquid.

This allows the sealed AFM cell to more easily form a sealed space using the wall.

Specifically, the end portion of the wall may form a groove together with a component having water repellency or oil repellency, and the groove may hold the sealing liquid.

This allows the component having water repellency or oil repellency and the end portion of the wall to form a groove in the wall, Therefore, the wall of the sealed AFM cell can hold the sealing liquid more stably.

The sealed AFM cell may further include a tube for replenishing the sealing liquid.

This can replenish the sealing liquid through the tube, Therefore, the sealed AFM cell can seal the inside without damaging sealing properties for many hours.

Specifically, the sealing liquid may be water, ionic liquid, fluorine-based inert liquid, or silicone oil.

It should be noted that the present invention can be not only achieved as such sealed AFM cell, but also achieved as an AFM having part or all of the functions of the sealed AFM cell.

Advantageous Effects of Invention

The present invention can provide a sealed AFM cell which does not decrease measurement accuracy or limit usable observation liquids.

DESCRIPTION OF EMBODIMENTS

Hereinafter, the embodiments of the present invention are described in detail with reference to the accompanying Drawings. It should be noted that each of the exemplary embodiments described below shows a general or specific example. Numerical values, shapes, materials, structural elements, the arrangement and connection of the structural elements, and others shown in the following embodiments are mere examples, and are not intended to limit the present invention. Moreover, among the structural elements in the following embodiments, the structural elements not recited in the independent claims representing superordinate concept are described as arbitrary structural elements.

Figure 1:
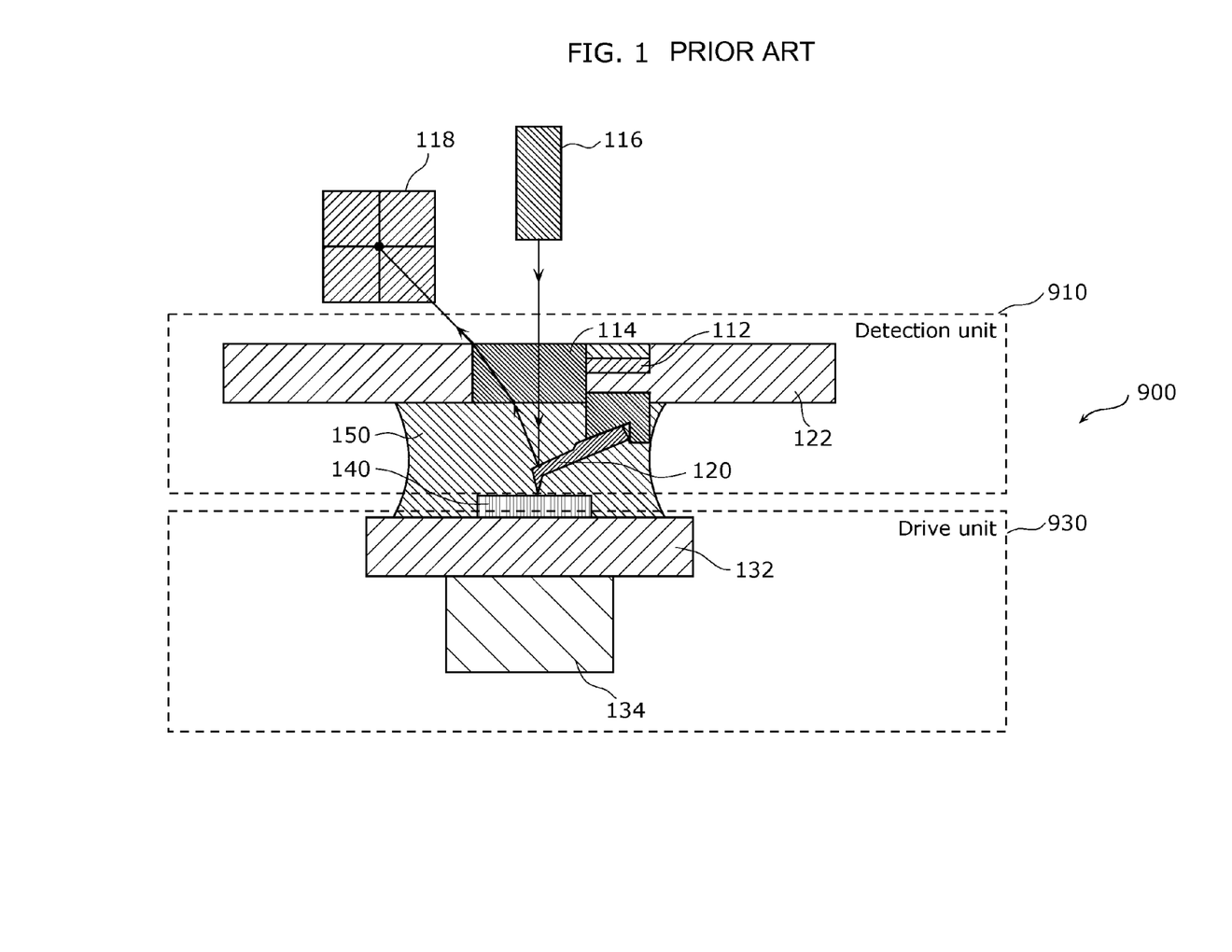
FIG. 1 illustrates a configuration of an AFM cell according to a related art of the present invention.
Figure 2A:
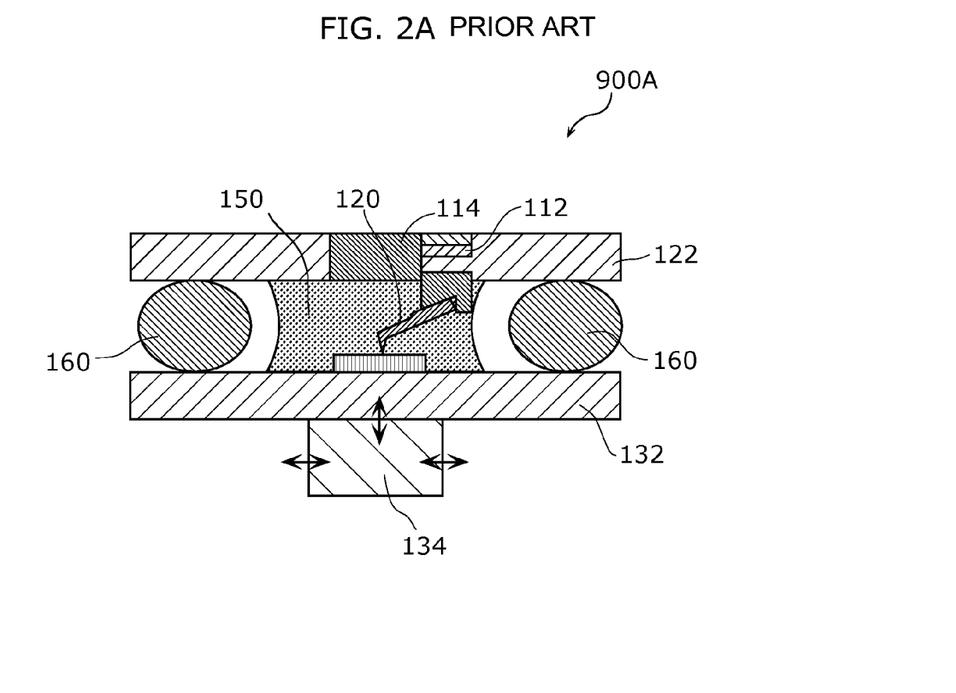
FIG. 2A illustrates a configuration of a sealed AFM cell according to another related art of the present invention.
Figure 2B:
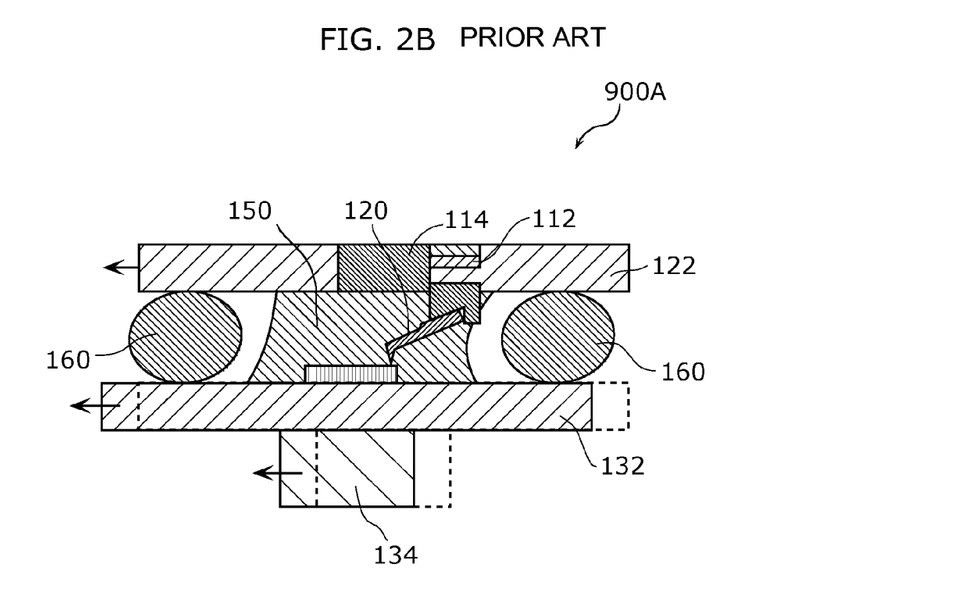
FIG. 2B illustrates an example when a lateral force is applied to the sealed AFM cell illustrated in FIG. 2A.

With reference to FIGS. 1 to 2B, the following describes the related arts of the present invention in further detail to clarify problems which a sealed AFM cell according to the present invention needs to solve.

FIG. 1 illustrates a configuration of an atmosphere open AFM cell 900 according to a related art of the present invention.

As FIG. 1 illustrates, in the atmosphere open AFM cell 900, an observation liquid is not sealed inside the AFM cell.

The atmosphere open AFM cell 900 includes a detection unit 910 and a drive unit 930. As described above, the detection unit 910 and the drive unit 930 are not mechanically joined. A sample 140 immersed in an observation liquid 150 is placed between the detection unit 910 and the drive unit 930.

More specifically, the detection unit 910 includes a piezoelectric vibrator 112, an optical window 114, a cantilever 120, and a lid part 122.

The piezoelectric vibrator 112 includes a piezoelectric element which vibrates when a voltage is applied. The piezoelectric vibrator 112 has a configuration, for example, in which a piezo-ceramic element is joined to a metal-made vibrator plate.

The atmosphere open AFM cell 900 detects a force of interaction between a probe and a sample by the approach called dynamic mode AFM. In the dynamic mode AFM, the piezoelectric vibrator 112 is an excitation unit for oscillating the cantilever.

The optical window 114 is a transparent window provided in the lid part. The optical window 114 is made of a material (such as a glass) which transmits a laser beam. The atmosphere open AFM cell 900 detects the displacement magnitude of the cantilever by the optical lever method, Here, a light beam (such as a laser beam) emitted from a light beam element 116 transmits through the optical window 114, and is reflected off the back side of the cantilever. Furthermore, the reflected light transmits through the optical window 114, and is detected by a position detection sensor 118 including a photodiode.

The cantilever 120 is a component having a cantilever structure. The cantilever 120 has one end at which a probe is provided and the other end which is mechanically joined to the lid part. The cantilever 120 is displaced depending on the force of interaction working between the sample 140 and the probe.

The lid part 122 holds the cantilever 120 so as to position the probe near the measurement surface, i.e., the surface of the sample 140.

Moreover, the drive unit 930 includes a sample holder 132 and a scanner 134.

The sample holder 132 fixes the sample 140. Specifically, the sample 140 is fixed to the sample holder 132 such that the measurement surface is directed upward.

The scanner 134 is a drive unit which moves the sample holder 132 in a horizontal plane. Moreover, the scanner 134 controls the distance between the probe and the sample by vertically moving the sample holder 132.

In the atmosphere open AFM cell 900, the observation liquid 150 evaporates during the measurement. As a result, measurement accuracy declines.

Meanwhile, FIG. 2A illustrates a configuration of a sealed AFM cell 900A according to another related art of the present invention. It should be noted that the same reference sings are given to structural elements similar to those illustrated in FIG. 1, and the detailed explanation will be omitted.

As FIG. 2A illustrates, the sealed AFM cell 900A according to the related art includes a rubber O ring 160 between the lid part 122 and the sample holder 132. Provision of the O ring 160 seals the observation liquid 150 inside the space formed by the lid part 122, the O ring 160, and the sample holder 132.

FIG. 2B illustrates an example of the state in which the scanner 134 applies a lateral force to the sealed AFM cell 900A.

When the scanner 134 moves to the left, a force in the left direction is applied to the sample holder 132 joined to the scanner 134. This force is also applied to the lid part 122 via the O ring 160. As a result, the force in the left direction is also applied to the lid part. This force displaces the cantilever 120 independently of a force of interaction. Therefore, the accuracy of measurement for the sample 140 by the AFM declines.

In the invention according to the related art described above, the observation liquid 150 is sealed with the O ring. Therefore, the accuracy of displacement measurement for the cantilever 120 declines.

A sealed AFM cell according to the present invention can solve these problems. This will be described in detail below.

Embodiment 1

Figure 3:
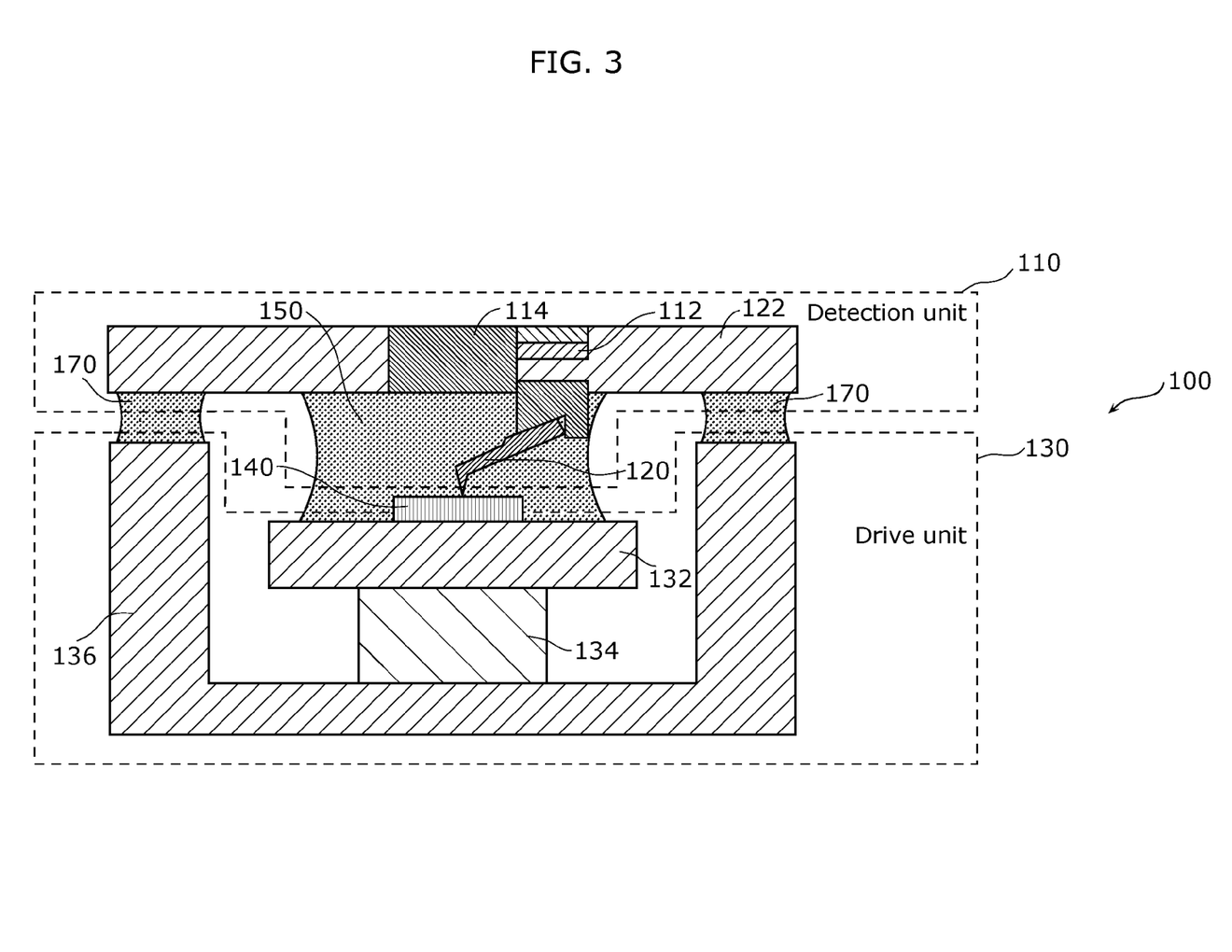
FIG. 3 illustrates a configuration of a sealed AFM cell according to Embodiment 1 of the present invention.

FIG. 3 illustrates a configuration of a sealed AFM cell 100 according to Embodiment 1 of the present invention. It should be noted that the same reference signs are given to structural elements similar to those of the atmosphere open AFM cell 900 illustrated in FIG. 1, and the detailed explanation will be omitted.

As FIG. 3 illustrates, the sealed AFM cell 100 includes a detection unit 110 and a drive unit 130. Unlike the atmosphere open AFM cell 900, the detection unit 110 and the drive unit 130 are joined via a sealing liquid 170. That is, the sealed AFM cell 100 seals the observation liquid 150 inside the space formed by the lid part 122, a main body part 136, and the sealing liquid 170.

More specifically, the detection unit 110 includes the piezoelectric vibrator 112, the optical window 114, the cantilever 120, and the lid part 122. Moreover, the drive unit 130 includes the sample holder 132, the scanner 134, and the main body part 136.

The main body part 136 holds the scanner 134. The main body part 136 is opposite the lid part 122 with the sample 140 on the sample holder 132 in between. More specifically, as FIG. 3 illustrates, the main body part has a depression shape, and the lid part 122 has a flat shape which allows to lid the main body part 136 in the depression shape.

It should be noted that the shapes of the lid part 122 and the main body part 136 are not limited to the above shapes. However, the lid part 122 and the main body part 136 take any shapes which allow a sealed space to be formed when the lid part 122 and the main body part 136 are joined via the sealing liquid. For instance, the lid part 122 may have a downward depression shape, and the main body part 136 may have a flat shape. Moreover, the lid part 122 may have a downward depression shape, and the main body part 136 may have a depression shape.

That is, at least one of the lid part 122 and the main body part 136 has a wall protruding from one of the lid part 122 and the main body part 136 toward the other to surround the sample holder 132.

Here, the end portion of the protruding wall holds the sealing liquid 170 which is different from the observation liquid 150. It should be noted that the structure of the lid part 122 and the main body part 136 does not allow the observation liquid 150 and the sealing liquid 170 to be in contact with each other. Therefore, any liquids suitable for the respective applications of the observation liquid 150 and the sealing liquid 170 can be used. Liquids usable as the sealing liquid 170 are, for example, water, ionic liquid, fluorine-based inert liquid, and silicone oil.

The lid part 122 and the main body part 136 are joined via the sealing liquid 170. The sealed AFM cell 100 seals the observation liquid 150 inside the space formed by the lid part 122, the main body part 136, and the sealing liquid 170.

As described above, in the sealed AFM cell 100 according to the present embodiment, a sealed space where evaporation of the observation liquid 150 is suppressed is formed by joining the lid part 122 and the main body part 136 via the sealing liquid 170. Moreover, the lid part 122 and the main body part 136 are joined only by the sealing liquid 170. Therefore, the lid part 122 and the main body part 136 are mechanically separated. Therefore, vibration on the side where drive unit 130 is located, generated by the scanner 134 or others can be prevented from being transmitted to the cantilever 120.

Furthermore, the shape of the sealing liquid 170 freely changes independently of mechanical components. Thus, the sealing liquid 170 has fewer limitations for the thickness of the sample 140 and an observation area, than the related art using, for example, an O ring.

Moreover, the observation liquid 150 and the sealing liquid 170 are not in direct contact. Therefore, it is possible to select various liquids for the observation liquid 150 and the sealing liquid 170 to be matched with the application of each liquid.

Figure 4A:
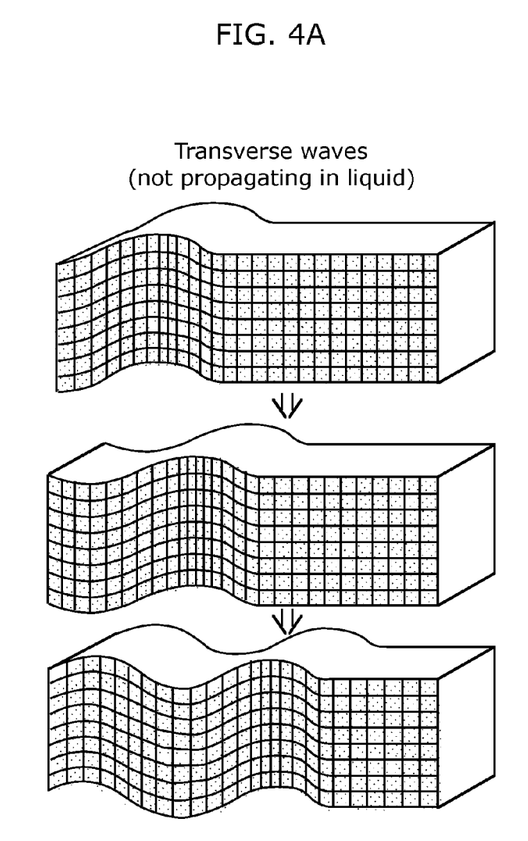
FIG. 4A is a conceptual diagram illustrating transverse waves propagating in a medium.
Figure 4B:
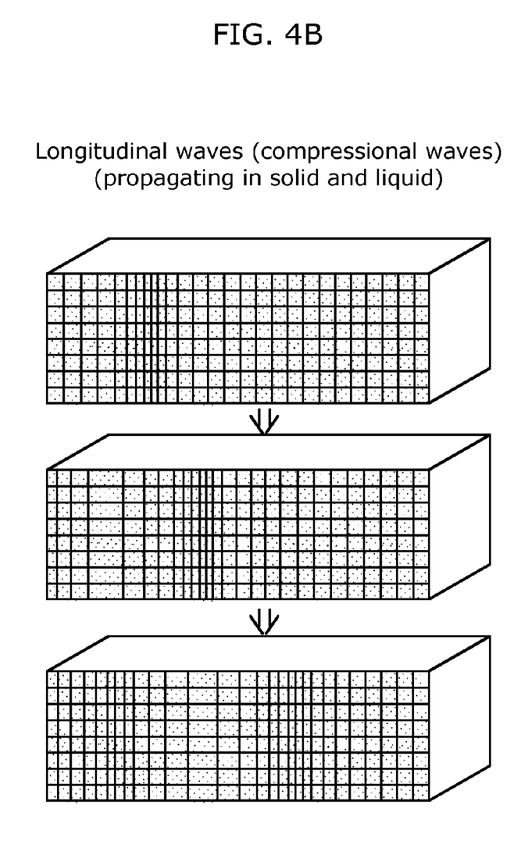
FIG. 4B is a conceptual diagram illustrating longitudinal waves (compressional waves) propagating in a medium.

With reference to FIGS. 4A and 4B, the following describes in further detail the advantages of joining the lid part 122 and the main body part 136 via the sealing liquid 170.

FIG. 4A is a conceptual diagram illustrating transverse waves propagating in a medium. In the transverse waves, the direction in which the medium vibrates is perpendicular to the direction in which the waves travel. Moreover, FIG. 4B is a conceptual diagram illustrating longitudinal waves (compressional waves) propagating in a medium. In the longitudinal waves, the direction in which the medium vibrates is parallel with the direction in which the waves travel.

Vibration generated by the scanner 134 or others includes both of the transverse waves and longitudinal waves. However, the transverse waves do not propagate in a liquid medium. Therefore, the transverse waves in the mechanical vibration generated by the scanner 134 or others do not propagate to the cantilever 120 via the sealing liquid 170.

Meanwhile, the longitudinal waves propagate in the liquid medium. However, acoustic impedance is significantly different between a solid medium and a liquid medium. Therefore, transmission of the longitudinal waves on the interface therebetween is remarkably low. Therefore, the longitudinal waves in the mechanical vibration generated by the scanner 134 or others can be prevented from propagating to the cantilever 120.

Embodiment 2

The basic configuration of the sealed AFM cell 100 according to Embodiment 1 was described above. The following describes a configuration of a sealed AFM cell capable of more stably joining the detection unit 110 and the drive unit 130 via the sealing liquid 170.

Figure 5:
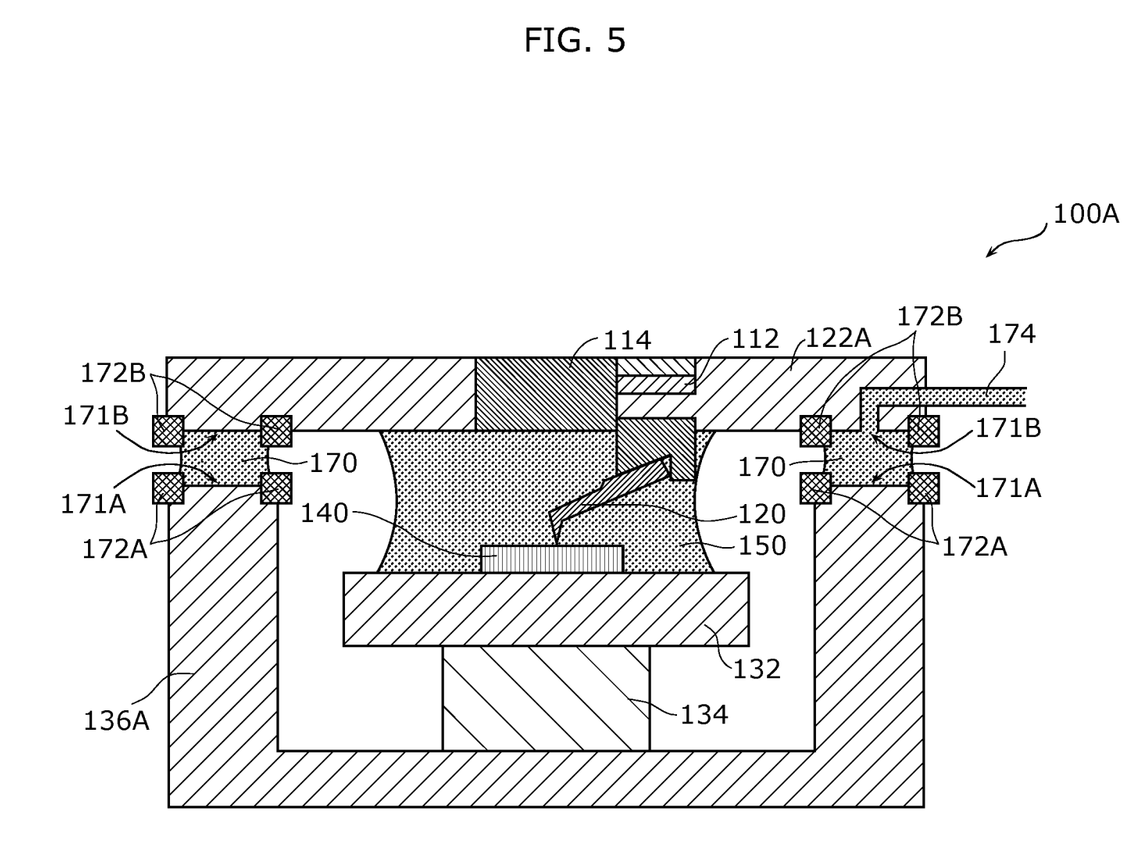
FIG. 5 illustrates a configuration of a sealed AFM cell according to Embodiment 2 of the present invention.

FIG. 5 illustrates the configuration of a sealed AFM cell 100A according to Embodiment 2 of the present invention.

As FIG. 5 illustrates, in the sealed AFM cell 100A, a groove 171A is formed in the end portion of the wall of a main body part 136A, and a groove 171B is formed in a portion opposite the end portion of the wall, in the back side of a lid part 122A. The groove 171A formed in the end portion of the wall of the main body part 136A is formed by components 172A having water repellency and the end portion of the wall of the main body part 136A. Moreover, the groove 171B formed in the portion opposite the end portion of the wall, in the back side of the lid part 122A is formed by components 172B having water repellency and the lid part 122A. Moreover, the grooves 171A and 171B are filled with the sealing liquid 170 through which the detection unit 110 and the drive unit 130 are joined.

That is, the end portion of the wall forms the groove 171A together with the two components 172A having water repellency. The groove 171A holds the sealing liquid 170. Silicone rubber or others may be, for example, used for the components 172A having water repellency.

More specifically, the lid part 122A is, for example, a disk-shaped component. Moreover, the main body part 136A is a cylinder-shaped component having a disk-shaped bottom having a diameter the same as that of the lid part 122A and a wall protruding toward the lid part 122A to surround the sample holder 132, in the circumference of the bottom.

Here, as FIG. 5 illustrates, the two components 172A in loop shapes and of different diameters having water repellency are formed in the end portion of the wall of the main body part 136A. The groove 171A is formed by the two components 172A and the end portion of the wall of the main body part 136A.

Likewise, the two components 172B in loop shapes and of different diameters having water repellency are formed at positions opposite the components 172A formed in the main body part 136A, in the back side of the lid part 122A. The groove 171B is formed by the two components 172B and the lid part 122A. The sealing liquid 170 is held in the grooves 171A and 171B respectively formed in the main body part 136A and the lid part 122A.

It should be noted that when the sealing liquid 170 is an oily liquid, the components 172A and the components 172B may be components having oil repellency but not water repellency. Here, the water repellency and oil repellency are the properties of the components 172A and 172B when a contact angle represented by a droplet of the sealing liquid 170 represents at least 10 degrees on the surfaces of the components 172A and 172B.

Moreover, as FIG. 5 illustrates, the sealed AFM cell 100A may include a tube 174 for replenishing the grooves 171A and 171B with the sealing liquid 170. It should be noted that in FIG. 5, the tube 174 is provided in the lid part 122A. However, the tube 174 may be provided in the main body part 136A.

Figure 6:
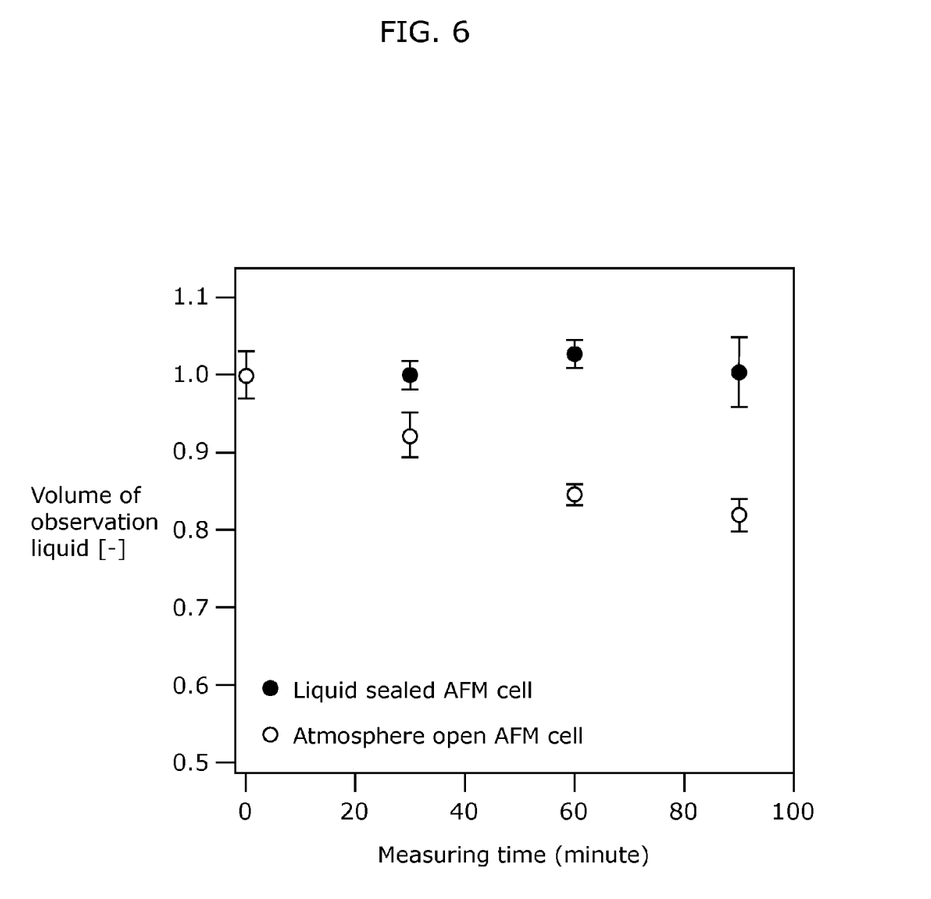
FIG. 6 illustrates a comparison of changes in volume of observation liquids in two kinds of AFM cells.

With reference to FIG. 6, the following describes the results of experiments performed for evaluating the sealing properties of the sealed AFM cell 100A according to the present embodiment.

FIG. 6 illustrates the comparison of changes in volume of observation liquids in two kinds of AFM cells. The vertical axis represents the volumes of the observation liquids 150 normalized with respect to the volumes of the observation liquids 150 when the observation is started. The horizontal axis represents measuring time (minutes). It should be noted that experiments were performed five times to ensure the accuracy of data. Each point represents the average value of the five times. Moreover, the bars extending above and below each point are error bars representing the range of standard deviation.

Specifically, in the sealed AFM cell 100A, 200 microliter (μl) of phosphate buffered saline (PBS), which is the observation liquid 150 were dropped on the sample holder 132 and sealed using pure water as the sealing liquid 170. Then, a room temperature was maintained at 25 degrees centigrade, and a change in volume of the observation liquid 150 was observed.

Moreover, for comparison, also in the atmosphere open AFM cell which does not seal the observation liquid 150, according to the conventional art, 200 μl of PBS was dropped in the same way, and a change in volume of the observation liquid 150 was observed.

As a result, as FIG. 6 illustrates, in the atmosphere open AFM cell, the volume of the observation liquid 150 decreases with the lapse of the measuring time, and around 20% evaporated for 90 minutes. Meanwhile, in the sealed AFM cell 100A, no significant change was seen in the volume of the observation liquid 150 even after 90 minutes has passed.

Moreover, in the experiments, the displacement of the cantilever 120 could be detected for many hours by using the sealed AFM cell 100A.

It is clear from the above experimental results that the sealed AFM cell 100A can sufficiently suppress evaporation of the observation liquid 150. Moreover, mechanical separation of the cantilever 120 and a drive unit such as the scanner 134 can prevent the vibration of the drive unit from being transmitted to the cantilever 120.

The sealed AFM cells according to Embodiments 1 and 2 of the present invention were described above. However, the present invention is not limited to these embodiments.

For instance, in the above figures, corners and sides of each structural element are illustrated linearly. However, the present invention also includes round corners and curved sides formed for manufacturing reasons.

Figure 7:
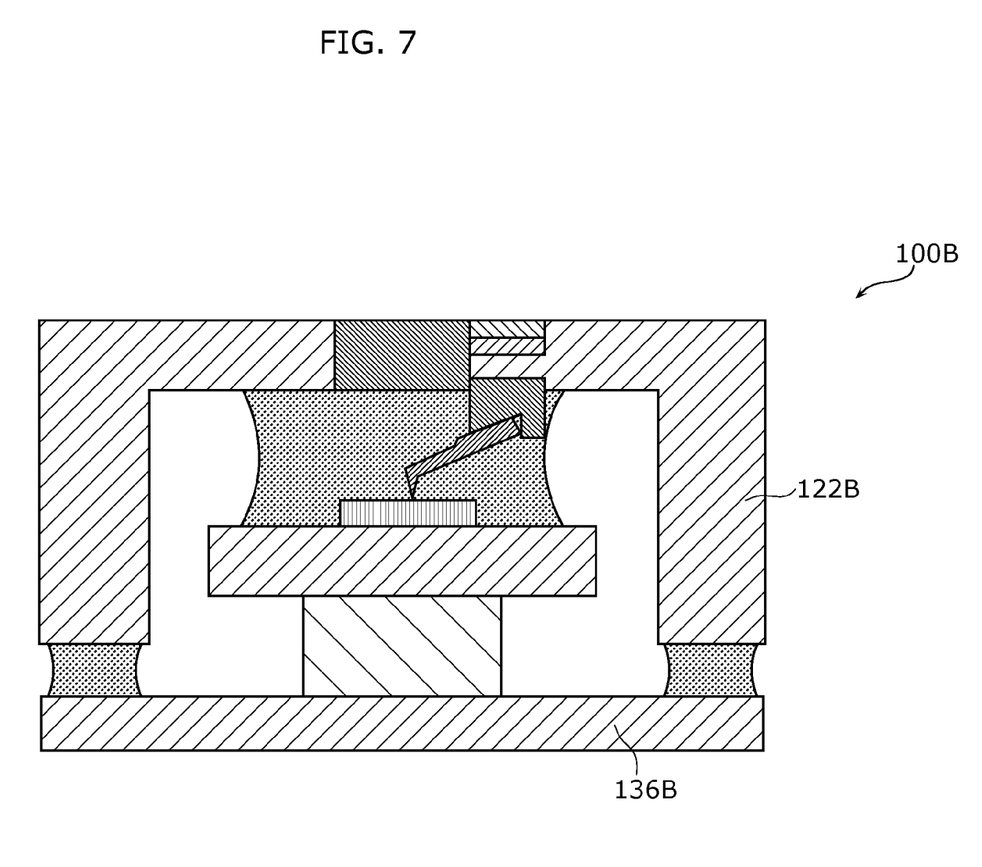
FIG. 7 illustrates another example of the shapes of a lid part and a main body part.

Moreover, in FIG. 3, the main body part 136 has a wall. However, as described above, at least one of the lid part 122 and the main body part 136 may have a wall. For instance, as FIG. 7 illustrates, in a sealed AFM cell 100B, a lid part 122B may have a wall protruding toward a main body part 136B.

It should be noted that the sealed AFM cell according to Embodiment 1 or 2 does not necessarily have a wall. For instance, at least one of the lid part and the main body part may have a groove formed with a component having water repellency or oil repellency, and the groove may hold a sealing liquid inside.

Moreover, the sealed AFM cell according to Embodiment 1 or 2 and at least part of the functions of a modification thereof may be combined.

Furthermore, the present invention also includes various modifications obtained by making changes, which those skilled in the art would conceive, to the embodiment unless the modifications depart from the scope of the present invention.

Moreover, the numerals used above are exemplified to specifically explain the entirety of the present invention. Thus, the present invention is not limited to the exemplified numerals. Moreover, the connections between structural elements are exemplified to specifically explain the present invention, and connections for achieving the functions of the present invention are not limited to the exemplified connections.

Moreover, the configuration of the above sealed AFM cell is exemplified to specifically explain the present invention. The sealed AFM cell according to the present invention does not necessarily have all of the structural elements of the above configuration. That is, the sealed AFM cell according to the present invention may have minimum structural elements which can achieve the advantages of the present invention.

The disclosed embodiments here are examples in every aspect. Therefore, the present invention should not be limited to these embodiments. The scope of the present invention is illustrated not by the above description but by Claims. Claims and equivalent meanings and all changes within the scope are intended to be included in the scope of the present invention.

INDUSTRIAL APPLICABILITY

The present invention is applicable to AFM cells and, in particular, to a sealed AFM cell for sealing an observation liquid.

REFERENCE SIGNS LIST 100, 100A, 100B, and 900A sealed AFM cell
110 and 910 detection unit
112 piezoelectric vibrator
114 optical window
116 light beam element
118 position detection sensor
120 cantilever
122, 122A, and 122B lid part
130 and 930 drive unit
132 sample holder
134 scanner
136, 136A, and 136B main body part
140 sample
150 observation liquid
160 O ring
170 sealing liquid
171A and 171B groove
172A and 172B component
174 tube
900 atmosphere open AFM cell

The invention claimed is:

1. A sealed atomic force microscope cell for an atomic force microscope which measures a sample immersed in an observation liquid, the sealed atomic force microscope cell comprising:
   a cantilever including a probe;
   a sample holder for fixing the sample;
   a scanner comprising a drive unit configured to move the sample holder;
   a lid part which holds the cantilever so as to position the probe near a measurement surface of the sample on the sample holder;
   a main body part comprising a body component holding the scanner and positioned opposite the lid part with the sample on the sample holder in between;
   a sealing component that is provided on at least one of the lid part and the main body part, the sealing component having water repellency or oil repellency; and
   a sealing liquid that is held by the sealing component and by at least one of the lid part and the main body part,
   wherein the sealing liquid is different from the observation liquid and is not in touch with the observation liquid,
   wherein the lid part and the main body part are joined together via the sealing liquid, and
   wherein the observation liquid is sealed inside a space formed by the lid part, the main body part and the sealing liquid;
   wherein at least one of the lid part and the main body part has a wall protruding from one of the lid part and the main body part toward the other of the lid part and the main body part to surround the sample holder, wherein the sealing component is provided on an end portion of the wall, and wherein the sealing liquid is held by the end portion of the wall and the component.

2. The sealed atomic force microscope cell of claim 1, wherein at least one of the lid part and the main body part has a groove, wherein the groove is formed by the sealing component and by the at least one of the lid part and the main body part which the sealing component is on, and wherein the groove holds the sealing liquid.

3. The sealed atomic force microscope cell of claim 1, wherein the end portion of the wall forms a groove together with the sealing component on the end portion of the wall, and wherein the groove holds the sealing liquid.

4. The sealed atomic force microscope cell of claim 1, further comprising a tube for replenishing the sealing liquid.

5. The sealed atomic force microscope cell of claim 1, wherein the sealing liquid is water, ionic liquid, fluorine-based inert liquid or silicone oil.

* * * * *